Aug. 10, 1965　　E. ANDERSEN　　3,200,294
PROTECTION SYSTEM FOR A DRIVING MOTOR
Filed Oct. 18, 1961

United States Patent Office

3,200,294
Patented Aug. 10, 1965

3,200,294
PROTECTION SYSTEM FOR A DRIVING MOTOR
Erik Andersen, Nordborg, Denmark, assignor to Danfoss ved ing. M. Clausen, Nordborg, Denmark, a company of Denmark
Filed Oct. 18, 1961, Ser. No. 173,845
Claims priority, application Germany, Oct. 19, 1960, D 34,560
11 Claims. (Cl. 317—13)

This invention relates to a protection system for a driving motor, viz. a motor which is connected to drive some mechanical device, such as a compressor.

In the case of motor-driven devices, such as compressors, pumps, and the like, there is a need for effective means to de-energize the motor automatically if a defect or malfunction in the driven system, such as failure in the lubrication of the compressor or pump. If lubrication fails, the motor must be stopped to prevent damage.

It is accordingly the object of the present invention to provide a protection system for a driving motor which is effective to de-energize the motor in automatic response to a malfunction in the driven assembly.

In accordance with the invention, there is provided in the circuit of a driving motor, a safety system comprising a current-responsive delay link of a safety switch connected with a switch which reacts to a malfunction in the mechanism to be protected and is effective to de-energize the motor. Such a protection arrangement can, for example, be connected to control the oil lubrication in a compressor. In this case, a differential pressure control, which measures the pressure difference between the pressure of the oil pump and the pressure in the crankshaft housing, is utilized. If the pressure differential falls below a predetermined value, the contacts of the pressure control close, and a delay link, for example, the heatable element of a safety switch, is activated. The safety switch can, for example, be a bimetallic time switch. The safety switch, upon being activated, cuts-off the current to the driving motor of the compressor within 60 to 90 seconds. It is apparent that this protection arrangement can also be utilized in connection with other systems and in connection with other mechanisms subject to malfunction.

However, a faulty safety switch, e.g. one having a break or burn-out in its heatable element, for example, can lead to disastrous results if the system, in spite of the malfunction, stays in operation. Heretofore, the possibility of such an occurrence was considered to be a necessary risk and there was no effective means for protecting against failure of the safety switch. The present invention is characterized by the fact that, in the current circuit of the delay link, there is incorporated an emergency relay activated by the current that flows through the delay link, and which, upon a current interruption, switches over. According to the invention, the actual protection arrangement for the system is also provided with another independent protection arrangement. If care is taken that an auxiliary current continuously flows through the delay link, a failure in the delay link can be detected immediately after its occurrence by an optical or an acoustic signal.

It is safer and more desirable if the emergency relay is arranged to serve a change-over switch which, if the occasion should arise, is effective to disengage the motor. In this case, it is sufficient if the emergency relay detects the failure of the safety switch at the moment the failure occurs in the system, because the motor at this moment will be disengaged and a further dangerous development is thereby prevented. The emergency relay in this case serves the function of the safety switch and only the removal of the time delay needs to be taken into consideration.

In order to avoid the influence on the line, it is recommended that both the safety switch and the emergency relay be placed in the current circuit of the relay of the motor protection switch.

Furthermore, the delay link and the emergency relay can be connected to act upon the same switch. In another embodiment, which relates to the combination of the safety switch with an emergency relay, the safety switch is placed in the circuit of the delay link and thus is effective to produce artificially a current cut-off as a result of which the emergency relay deenergizes the motor. In this case the emergency relay can be replaced by the relay of the motor protection switch.

Further characteristics of the invention will be apparent from the following detailed description of illustrative embodiments of the invention, taken in connection with the accompanying drawings wherein, FIG. 1 is a diagrammatic view of a system embodying features of the invention;

Figure 1:
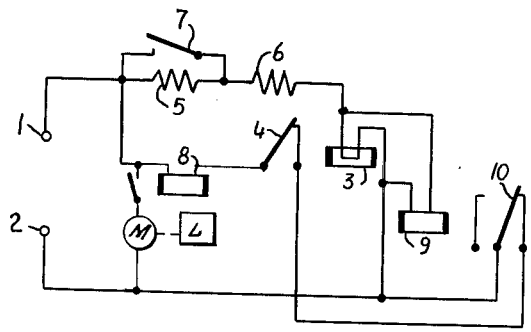

Referring to the drawings, and more particularly to FIG. 1, the necessary current for operating the system is supplied through the terminals 1 and 2. The delay link 3 of the safety switch 4 is connected in series with the resistors 5 and 6. The current, which in this device normally flows through the delay link 3, does not influence the safety switch. The resistor 5 can be short-circuited by the malfunction detecting switch 7, which is responsive to malfunction in mechanism L driven by the motor M. The switch 7 can, for example, be connected to a differential pressure recorder in a compressor lubricating system when the driven mechanism is a compressor.

The increased current flow which is thus brought about actuates the delay link 3 so that the safety switch 4 opens within 60 to 90 seconds. The safety switch is disposed in the current circuit of the relay 8 of the motor M protection switch (not further shown), so that when the current to the relay 8 is interrupted, the motor is de-energized.

In addition to the above-described elements, the system according to the invention further suitably comprises an emergency relay 9, the switch 10 of which is connected in series with the safety switch 4 in the circuit of the motor relay 8. The current flow in the emergency relay 9 is generally dependent upon the voltage drop which is produced by the current flow in the delay link 3. During normal operation, the voltage drop is so minimal that the current flowing through the relay 9 is too feeble to activate it. If the heatable element of the delay link is fused and ruptured, a considerable current will flow through the emergency relay 9, so that the switch 10 will be activated and, through the motor relay 8, the motor will be de-energized. Thus, it is seen that the motor is de-energized if a malfunction which activates the switch 7 occurs and protection against failure of the safety switch is provided in a highly-effective manner.

Figure 2:
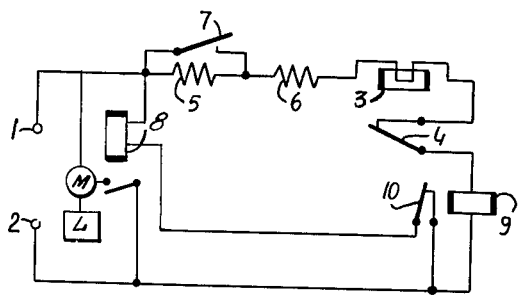
FIG. 2 is a similar view showing a second embodiment of the invention.

In the embodiment of FIG. 2, the same switch elements formed in FIG. 1 are utilized. However, in this case, the emergency relay 9 is connected in series with the delay link 3, and the safety switch 4 is connected in series with these two elements mentioned. The switch 10 of the emergency relay 9 alone is able to open the circuit of the motor relay 8.

During normal operation, a relative feeble current flows through the emergency relay 9, the strength of this current being determined by the total resistance of the series-connected elements. This current is sufficient to activate the emergency relay 9. If the heatable element of the delay link 3 burns out or melts, the current is interrupted and the emergency relay is deactivated and the switch 10 interrupts the current supply to the motor relay, so that the motor is de-energized. By reason of these connections, a failure in the delay link 3 is at once determined and the entire system is de-energized. Thus, in this system the emergency relay 9 protects against failure not only of the delay link but at the same time of all other switch elements connected in series with it. With a complete connection, the afore-mentioned feeble current is not able to influence the safety switch. If the malfunction detector switch 7 is actuated, the delay link 3 reacts and opens the safety switch 4 after a certain lapse of time. In this case, the emergency relay 9 is dead, the switch 10 opens and the motor is de-energized by the motor relay 8. In this case, the emergency relay has not only the safety function but leads in each instance to the deenergization of the motor.

In an even simpler device, the elements 8 and 10 can be omitted if utilizing the relay of the motor protection switch is utilized as the emergency switch.

Figure 3:
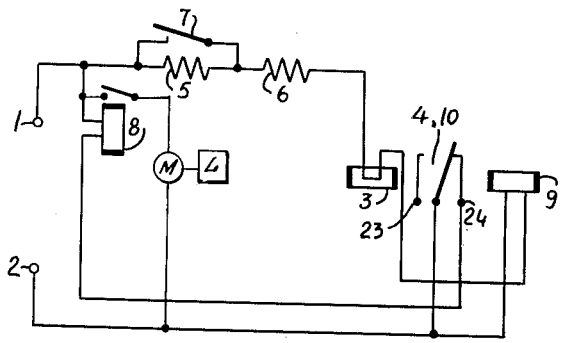
FIG. 3 is a like diagrammatic view illustrating a third embodiment of the invention.

In the embodiment according to FIG. 3 there is, as in FIG. 2, a connection in series of the delay link 3 and the emergency relay 9. These two elements thus both influence a common switch 4, 10 which is placed in the circuit of the motor relay 8. During normal operation, the current flow through the series connected elements is sufficient to place the relay 9, and the switch 4, 10 in their working position, whereby the motor relay is energized. As soon as the malfunction detector switch 7 is closed, the delay link 3, due to the increased current flow, becomes active so that the switch 4, 10, after a lapse of time, is placed in its dead position and the motor is de-energized. In the same manner, the motor is also de-energized when the emergency relay 9 becomes dead due to destruction of one of the series connected elements.

Figure 4:
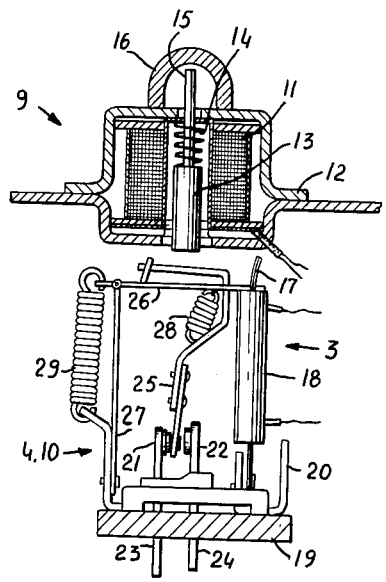
FIG. 4 is a cross-sectional view of a change-over switch utilized in the third embodiment shown in FIG. 3.

In FIG. 4 is shown a construction which can be utilized in the construction of FIG. 3 for the combinations 3, 9 and 4, 10. The emergency relay 9 consists of a coil 11 in a housing 12. The iron core 13 is pressed downwardly by means of a spring 14. When a current flows through the coil, the iron core is raised to the position shown, and the extension 15 engages the stopper 16. The delay link 3 consists of a bimetallic spring 17 surrounded by a heating coil 18. In the base 19 are mounted the terminal 20 as well as the fixed contacts 21 and 22 together with their leads 23 and 24. The terminal arm 25 and the movable contact are, through the combination of the lever 26, 27 and the springs 28, 29, in electrical connection with the terminal 20. The iron core 13 presses, in dead position, on the lever 25 and thereby places the movable contact against the fixed contacts 22.

In the case illustrated, when current flows through the coil 11, the lever 25 is released by the iron core 13, and the movable contact bears against the fixed contact 21 belonging to the motor relay 8. When the heating coil 18 is heated, the bimetallic spring 17 releases the lever 26. Due to the tension of spring 29, the lever 26 is moved upward, whereby the movable contact of the lever 25 again bears against the fixed contact 22.

It will, of course, be understood that the several individual components of the systems described and illustrated, e.g. the safety switch 4 with a delay link 3, the malfunction-responsive switch 7, the relays 8 and 9 of switches such as the switch 10, and the like, are suitably of conventional construction, unless otherwise indicated, although the construction shown in FIG. 4 is particularly suitable in the environment specified. A typical safety switch with a delay link is described, for example, in DAS 1,077,343 (German published application).

A typical malfunction-responsive switch is described in DAS 1,076,230; and switch relays are described in DAS 1,105,040.

Similarly, devices which activate the malfunction-responsive switch are of conventional construction and are appropriate to the mechanism to be protected. Thus, in the case of a compressor, reference has been made to a differential pressure indicator. Such a device is described, for example, in U.S. Patent 2,959,963.

It will be understood, furthermore, that various changes and modifications may be made in the embodiments described above and illustrated in the drawings and it is intended, therefore, that all matter contained in the foregoing description and in the drawings shall be interpreted as illustrative only and not as limitative of the invention.

I claim:

1. A protection system for an electric motor and mechanism driven by said motor, comprising a current supply circuit for energizing said motor, a safety switch for opening said circuit to de-energize the motor, said safety switch having a current-responsive delay link, a circuit supplying current to said delay link, a switch responsive to a malfunction in said driven mechanism and in the circuit of said delay link, said malfunction switch being operable to increase the currrent flow through said delay link and thereby activate said delay link in the event of a malfunction, and an emergency relay having an operating element in the circuit of said delay link and responsive to current flow through the delay link, said relay being connected with said motor energizing circuit to de-energize the motor upon interruption of current through said delay link.

2. A protection system as defined in claim 1, wherein said motor energizing circuit includes a motor protection relay having an operating element and wherein said emergency relay is connected with and operable to de-energize said motor protection relay.

3. A protection system as defined in claim 2, wherein safety switch and emergency relay are connected in series with the operating element of said motor protection relay to de-energize said motor protection relay upon opening of either of said safety switch or emergency relay.

4. A protection system as defined in claim 1, wherein said safety switch and emergency relay are combined as a single switch operable both by said delay link and by the operating element of said emergency relay.

5. A protection system as defined in claim 4, wherein said delay link and operating element of said emergency relay are connected in series with one another.

6. A protection system as defined in claim 1, in which said safety switch is connected in series with said delay link and the operating element of said emergency relay to de-energize said emergency relay upon opening of said safety switch by said delay link.

7. A protective system as defined in claim 1, in which the operating element of said emergency relay is connected across an impedance in circuit with said delay link so as to be responsive to a voltage drop in said impedance caused by the current flow in the delay link.

8. A protection system for an electric motor, comprising a current supply circuit for energizing said motor, a current-responsive delay link, a circuit supplying current to said delay link, a switch responsive to a malfunction in said driven mechanism and in the circuit of said delay link, said malfunction switch being operable to increase the current flow through said delay link and thereby activate said delay link in the event of a malfunction, electromagnetic relay operating means in the circuit of said delay link and responsive to current flow through the delay link, contact means actuatable both by said delay link and said relay operating means and connection between said contact means and said motor energizing circuit to de-energize said motor upon actuation of said contact means.

9. A protection system as defined in claim 8, wherein said delay link comprises a bimetallic element responsive to the heating effect of current controlled by said switch.

10. A protection system as defined in claim 9, wherein said relay operating means comprises an electromagnetic winding connected in series with said delay link.

11. A protection system as defined in claim 8, wherein said motor energizing circuit includes a motor protection relay having an operating element and wherein said contact means are connected in circuit with said operating element and control current flow through said operating element to actuate said motor protection relay.

References Cited by the Examiner

UNITED STATES PATENTS 2,697,195  12/54  Courtney _____ 317—13 X
2,818,535  12/57  Skeats et al. _____ 317—13

SAMUEL BERNSTEIN, *Primary Examiner.*